(12) United States Patent
Amano

(10) Patent No.: US 11,474,802 B2
(45) Date of Patent: Oct. 18, 2022

(54) INFORMATION PROCESSING APPARATUS

(71) Applicant: FUJIFILM Business Innovation Corp., Tokyo (JP)

(72) Inventor: Yasushi Amano, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 389 days.

(21) Appl. No.: 16/164,820

(22) Filed: Oct. 19, 2018

(65) Prior Publication Data

US 2019/0129708 A1 May 2, 2019

(30) Foreign Application Priority Data

Oct. 26, 2017 (JP) .............................. JP2017-207350

(51) Int. Cl.
*G06F 8/71* (2018.01)
*G06F 8/65* (2018.01)
*G06F 9/445* (2018.01)

(52) U.S. Cl.
CPC .................. *G06F 8/65* (2013.01); *G06F 8/71* (2013.01); *G06F 9/44505* (2013.01)

(58) Field of Classification Search
CPC .................. G06F 8/61; G06F 8/65; G06F 8/71
See application file for complete search history.

(56) References Cited

U.S. PATENT DOCUMENTS

| | | | | |
|---|---|---|---|---|
| 6,073,123 A * | 6/2000 | Staley | ..................... | G06F 21/10 705/51 |
| 10,375,205 B2 | 8/2019 | Kawamura et al. | | |
| 2008/0109799 A1 * | 5/2008 | Imamura | ................... | G06F 8/65 717/168 |
| 2009/0328025 A1 * | 12/2009 | Johnson | ..................... | G06F 8/71 717/170 |
| 2011/0072423 A1 * | 3/2011 | Fukata | ................. | G06F 9/44552 717/172 |
| 2011/0302574 A1 * | 12/2011 | Yoshikawa | ............... | G06F 8/65 717/173 |
| 2013/0024851 A1 * | 1/2013 | Firman | ..................... | G06F 8/60 717/170 |
| 2013/0111459 A1 | 5/2013 | Nakamoto | | |

(Continued)

FOREIGN PATENT DOCUMENTS

| | | |
|---|---|---|
| JP | 2005099967 | 4/2005 |
| JP | 2013097678 | 5/2013 |

(Continued)

OTHER PUBLICATIONS

"Office Action of Japan Counterpart Application" with English translation thereof, dated Sep. 28, 2021, p. 1-p. 13.

*Primary Examiner* — Duy Khuong T Nguyen
(74) *Attorney, Agent, or Firm* — JCIPRNET

(57) ABSTRACT

An information processing apparatus includes an acquisition section that acquires information regarding a version configuration indicating a version of one program held by each of plural processing devices or a combination of versions of plural programs thereof, from each of the plural processing devices, and a selection section that selects a specific version configuration from plural version configurations acquired by the acquisition section in accordance with a predetermined rule, in a case where version upgrade for a program held by a target processing device is performed.

21 Claims, 16 Drawing Sheets

---

DEFAULT RULE

APPLYING LATEST VERSION CONFIGURATION

---

LATEST VERSION CONFIGURATION

· VERSION OF EACH PIECE OF FIRMWARE

SCAN   1.7
    FAX    2.4
    COPY   4.1
    PRINT  3.4

· NUMBER OF DEVICES TO WHICH
  VERSION CONFIGURATION IS APPLIED   10

(56) References Cited

U.S. PATENT DOCUMENTS

| | | | | |
|---|---|---|---|---|
| 2015/0363188 A1* | 12/2015 | Tsuchiya | ................... | G06F 8/65 |
| | | | | 717/173 |
| 2016/0378454 A1* | 12/2016 | Nekrestyanov | ........... | G06F 8/65 |
| | | | | 717/170 |
| 2017/0262277 A1* | 9/2017 | Endo | ......................... | G06F 8/65 |

FOREIGN PATENT DOCUMENTS

| | | |
|---|---|---|
| JP | 2016009231 | 1/2016 |
| JP | 2017134506 | 8/2017 |
| WO | 2015159815 | 10/2015 |

\* cited by examiner

| FUNCTION | LATEST VERSION | PREVIOUS VERSION |
|---|---|---|
| SCAN (SCAN) | 1.7 | 1.2 |
| FAX (FAX) | 2.4<br>USAGE AGREEMENT IS PROVIDED | 2.1 |
| COPY (COPY) | 4.1 | 3.5 |
| PRINT (PRINT) | 3.4<br>PROBLEM IN Ver. 2.5 IS FIXED | 2.5<br>PROBLEM IS REPORTED |

FIG. 8

OPERATION INFORMATION OF
TRANSMISSION DESTINATION

- VERSION OF EACH PIECE OF FIRMWARE

SCAN    1.2
    FAX     2.1
    COPY    3.5

- USE FUNCTION

COPYING PROCESSING
    FAX RECEPTION-AND-EXTERNAL
    SERVER TRANSMISSION PROCESSING
        TRANSMISSION DESTINATION
            XXX SERVER

FIG. 9

DEFAULT RULE

APPLYING LATEST VERSION CONFIGURATION

LATEST VERSION CONFIGURATION

- VERSION OF EACH PIECE OF FIRMWARE

SCAN    1.7
    FAX     2.4
    COPY    4.1
    PRINT   3.4

- NUMBER OF DEVICES TO WHICH
  VERSION CONFIGURATION IS APPLIED  10

FIG. 10

DEFAULT RULE

RULE 1    APPLYING LATEST VERSION CONFIGURATION ONLY TO VERSION OF USE FUNCTION

RULE 2    APPLYING VERSION CONFIGURATION APPLIED TO DEVICES OF WHICH THE NUMBER IS LARGEST

VERSION CONFIGURATION APPLIED TO
DEVICES OF WHICH THE NUMBER IS LARGEST

- VERSION OF EACH PIECE OF FIRMWARE

SCAN    1.7
    FAX     2.4
    COPY    4.1
    PRINT   2.5

- NUMBER OF DEVICES TO WHICH
  VERSION CONFIGURATION IS APPLIED  10000

FIG. 17

| APPLIED RULE | |
|---|---|
| RULE 1 | IN CASE WHERE PROBLEM IS HANDLED, APPLYING LATEST VERSION CONFIGURATION IN WHICH PROBLEM IS FIXED |
| RULE 2 | PERFORMING NOTIFICATION OF WHETHER VERSION CONFIGURATION IS APPLIED |

FIG. 18

| APPLIED RULE | |
|---|---|
| RULE 1 | APPLYING LATEST VERSION CONFIGURATION |
| RULE 2 | IN CASE WHERE FUNCTION DIFFERENCE IS PROVIDED, PERFORMING NOTIFICATION OF WHETHER VERSION CONFIGURATION IS APPLIED |

FIG. 20

OPERATION INFORMATION OF
TRANSMISSION DESTINATION

- VERSION OF EACH PIECE OF FIRMWARE
  CARD CONTROL   2.1

- USE FUNCTION
  AUTHENTICATION PROCESSING
  TYPE OF CARD
        ID CARD   1.1

INFORMATION PROCESSING APPARATUS

CROSS-REFERENCE TO RELATED APPLICATIONS

This application is based on and claims priority under 35 USC 119 from Japanese Patent Application No. 2017-207350 filed Oct. 26, 2017.

BACKGROUND

Technical Field

The present invention relates to an information processing apparatus, a non-transitory computer readable medium storing a program, and a management system.

SUMMARY

According to an aspect of the invention, there is provided an information processing apparatus which includes an acquisition section that acquires information regarding a version configuration indicating a version of one program held by each of plural processing devices or a combination of versions of plural programs thereof, from each of the plural processing devices, and a selection section that selects a specific version configuration from plural version configurations acquired by the acquisition section in accordance with a predetermined rule, in a case where version upgrade for a program held by a target processing device is performed.

BRIEF DESCRIPTION OF THE DRAWINGS

Exemplary embodiment(s) of the present invention will be described in detail based on the following figures, wherein:

FIG. 8 is a diagram illustrating an example of operation information of the processing device as a transmission destination;

FIG. 9 is a diagram illustrating an example of a version configuration selected in accordance with a rule;

FIG. 10 is a diagram illustrating another example of the version configuration selected in accordance with the rule;

FIG. 17 is a diagram illustrating an example of a changed rule setting;

FIG. 18 is a diagram illustrating another example of the changed rule setting;

FIG. 20 is a diagram illustrating an example of the operation information of the processing device as the transmission destination.

DETAILED DESCRIPTION

Hereinafter, an example of an exemplary embodiment of the present invention will be described in detail with reference to the drawings.

First Exemplary Embodiment

Management System

Figure 1:
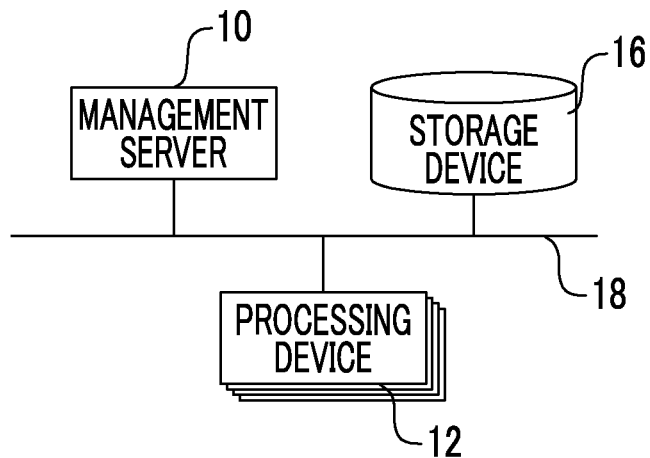
FIG. 1 is a block diagram illustrating an example of a configuration of a management system.

Firstly, a management system according to an exemplary embodiment of the present invention will be described. FIG. 1 is a block diagram illustrating an example of a configuration of the management system. As illustrated in FIG. 1, the management system according to the exemplary embodiment includes a management server 10, plural processing devices 12 managed by the management server 10, and a storage device 16 disposed on the outside of the management server 10. The management server 10, the plural processing devices 12, and the storage device 16 are connected to a communication line 18 so as to transmit and receive information to and from each other via the communication line 18. The management server 10 is an example of "an information processing apparatus".

The management server 10 is operated by a manager of the system. The processing device 12 is operated by a user of the processing device 12.

Each of the plural processing devices 12 includes at least one function. Firmware for each function is stored in a storage portion of each of the plural processing devices 12. Here, "the firmware" means a program for controlling the processing device to perform processing depending on a predetermined function. "The firmware" is an example of a program held in the processing device.

In the exemplary embodiment, the management server 10 manages a situation regarding version upgrade of the firmware held in each of the plural processing devices, for each of the processing devices 12. The management server 10 performs version upgrade of the firmware in accordance with a predetermined rule. The rule refers to a rule relating to the version upgrade. In the rule, a condition for selecting a version configuration, for example, "applying the latest version configuration" or "being applied only to a version of a use function", or a target of the version upgrade is defined.

Plural pieces of firmware of versions are stored in the storage device 16 respectively. Various pieces of information which have been collected from each of the plural processing devices 12 and include a use history are stored in the storage device 16 as "operation information". "The operation information" will be described later.

Management Server

Next, the management server will be described.

Figure 2:
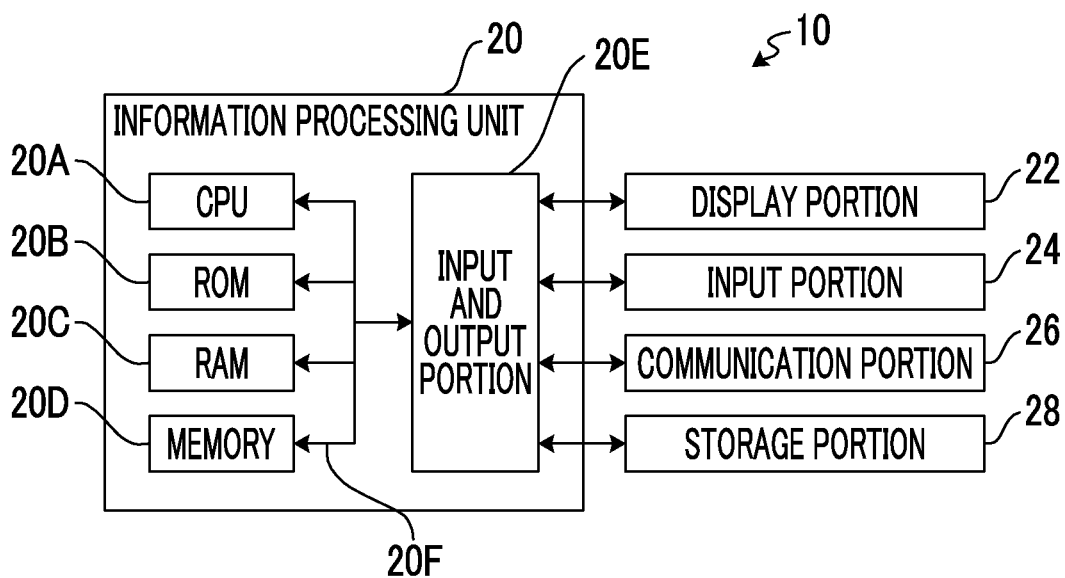
FIG. 2 is a block diagram illustrating an example of an electrical configuration of a management server.

FIG. 2 is a block diagram illustrating an example of an electrical configuration of the management server. As illustrated in FIG. 2, the management server 10 includes an information processing portion 20. The information processing portion 20 is configured as a computer that controls the entirety of the server and performs various operations. That is, the information processing portion 20 includes a central processing unit (CPU) 20A, a read only memory (ROM) 20B, a random access memory (RAM) 20C, a nonvolatile memory 20D, and an input and output portion (I/O) 20E.

The CPU 20A, the ROM 20B, the RAM 20C, the memory 20D, and the I/O 20E are connected to each other via a bus 20F. For example, the CPU 20A reads a program stored in the ROM 20B and executes the program by using the RAM 20C as a work area. A display portion 22 such as a display, an input portion 24 such as a keyboard or a mouse, a communication portion 26, and a storage portion 28 are connected to the I/O 20E of the information processing portion 20.

The communication portion 26 is an interface for communicating with an external device via a wired or wireless communication line. For example, the communication portion functions as an interface for communicating with the external device such as a computer, which is connected to a network such as a local area network (LAN) or the Internet. The storage portion 28 is an external storage device such as a hard disk.

In the exemplary embodiment, a case where various control programs for performing "information collection processing" or "update processing", which will be described later are stored in the ROM 20B will be described. However, a storage area of the program is not limited to the ROM 20B. The various programs may be stored in other storage devices such as the memory 20D or the storage portion 28 and may be acquired from the external device via the communication portion 26.

Various drives may be connected to the information processing portion 20. The various drives are devices that read data from a computer-readable portable recording medium such as a CD-ROM and a universal serial bus (USB) memory or write data in the recording medium. In a case of including the various drives, the program may be recorded in a portable recording medium and may be read and executed by the drive corresponding to the program.

Processing Device

Next, the processing device will be described.

The processing device is a device which includes at least one function and holds firmware for controlling the processing device to perform processing corresponding to the function. As an example of the processing device, a multifunctional device having plural functions is provided. In a case where the processing device is a multifunctional device, the processing device includes functions, for example, as follows: a scanner function of reading an image formed on paper, as image data; a facsimile function of transmitting image data to another image processing device connected to a public line or the like; a copying function of copying an image formed on paper, to another piece of paper; and a printing function of forming an image corresponding to image data on paper.

Figures 3, 4:
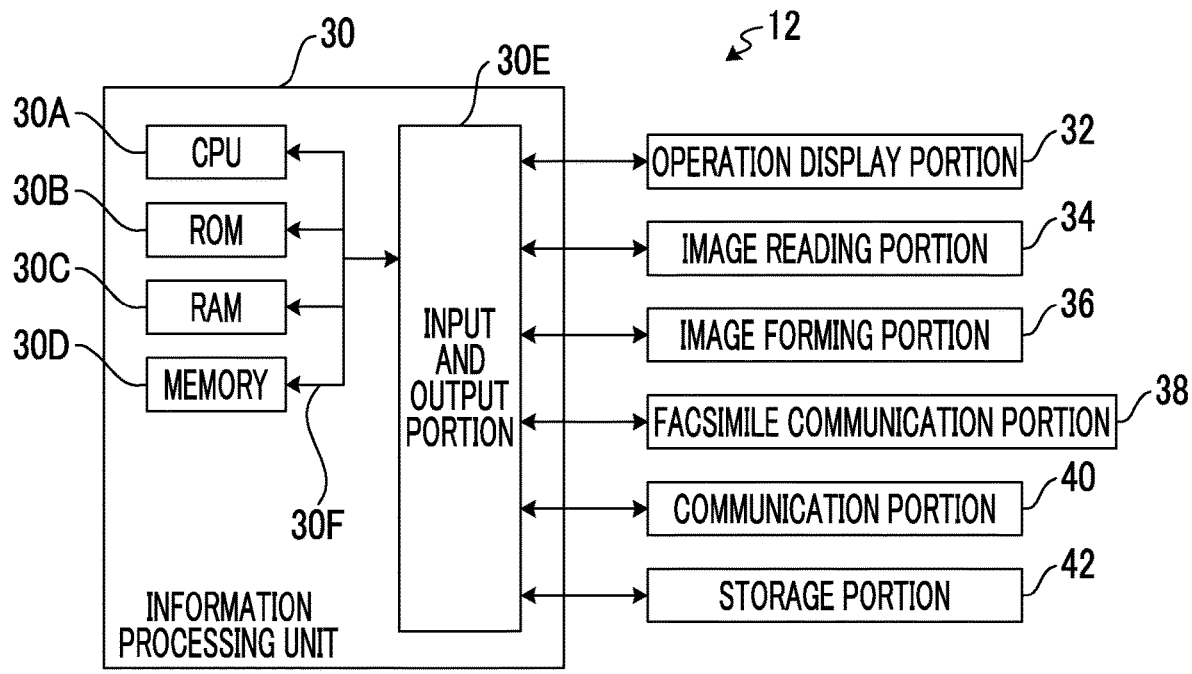
FIG. 3 is a block diagram illustrating an example of an electrical configuration of a processing device.
FIG. 4 is a table illustrating a version of firmware stored in a storage device.

FIG. 3 is a block diagram illustrating an example of an electrical configuration of the processing device. As illustrated in FIG. 3, the processing device 12 includes an information processing portion 30. The information processing portion 30 is configured as a computer that controls the entirety of the device and performs various operations. That is, the information processing portion 30 includes a CPU 30A, a ROM 30B, a RAM 30C, a memory 30D, and an I/O 30E.

The CPU 30A, the ROM 30B, the RAM 30C, the memory 30D, and the I/O 30E are connected to each other via a bus 30F. For example, the CPU 30A reads a program stored in the ROM 30B and executes the program by using the RAM 30C as a work area. In the exemplary embodiment, the processing device 12 is a multifunctional device having plural functions. An operation display portion 32, an image reading portion 34, an image forming portion 36, a facsimile communication portion 38, a communication portion 40, and a storage portion 42 are connected to the I/O 30E of the information processing portion 30.

The operation display portion 32 includes various buttons, an operation panel for displaying various screens, and the like. With the configuration, the operation display portion 32 receives an operation from a user and displays various kinds of information for the user.

The image reading portion 34 includes an image reader such as a line sensor. With the configuration, the image reading portion 34 reads an image recorded on an original document and outputs image data obtained by reading the image to the CPU 30A via the I/O 30E.

The image forming portion 36 forms an image on paper based on image data. An image forming method may be an electrophotographic method or an ink jet method. For example, in a case of forming an image by an electrophotographic method, the image forming portion 36 includes an image forming unit, a fixing device, and the like. The image forming unit includes a photosensitive drum, a charging device, an exposure device, a developing device, a transferring device, a cleaning device, and the like.

The facsimile communication portion 38 transmits and receives a facsimile message. The communication portion 40 is an interface for communicating with an external device via a wired or wireless communication line. The storage portion 42 is an external storage device such as a hard disk. In the following descriptions, the facsimile function is abbreviated as "facsimile (FAX)".

Version Upgrade

As described above, the management server 10 manages the situation of version upgrade of firmware held by each of the plural processing devices 12. Here, "version upgrade" means that firmware (program) held by the device is updated with firmware of the new version.

FIG. 4 is a table illustrating each version of firmware stored in the storage device. As illustrated in FIG. 4, firmware for performing processing corresponding to each of the scanner function, the facsimile function, the copying function, the printing function, and the like provided in the processing device is stored in the storage device 16 illustrated in FIG. 1. In a case where plural pieces of firmware having different versions are provided for one function, pieces of firmware which are provided for the function and have plural versions are stored.

In the example illustrated in FIG. 4, two versions of the latest version and the previous version are provided for each piece of firmware. Version 1.7 and Version 1.2 are provided for the scanner function (SCAN). Version 2.4 and Version 2.1 are provided for the facsimile function (FAX). Version 4.1 and Version 3.5 are provided for the copying function (COPY). Version 3.4 and Version 2.5 are provided for the printing function (PRINT). Firmware of each version is stored in the storage device 16. As the version becomes newer, the version number increases.

Each piece of firmware is stored along with various kinds of additional information. In the example illustrated in FIG. 4, information indicating that the usage agreement is provided is attached to firmware having the latest version (2.4) for the facsimile function. Information indicating that a problem in Version (Ver) 2.5 is fixed is attached to firmware of the latest version (3.4) for the printing function. Information indicating that a problem is reported is attached to firmware of the previous version (2.5).

The management server 10 also has information regarding the kind (including the latest version) of the version of each piece of firmware, and thus can recognize a difference in version or a difference in function. The management server 10 has information regarding whether or not the usage agreement is provided, and information regarding a problem, in addition to the information regarding the kind of the version. The information regarding the problem includes information of whether or not a problem occurs, information of the number of times of reporting a problem, and information of whether or not this version is aversion in which a problem has been fixed.

The new version is applied for each function (that is, for each piece of firmware). Therefore, the number of combinations of versions for each of plural pieces of firmware held in one processing device 12 having plural functions increases. A combination of versions for one program held by each of the plural processing devices or a combination of versions for each of plural programs is referred to as "a version configuration" below. A combination in which a problem occurs is provided in a large number of version configurations.

In a case where plural pieces of firmware cooperate with each other to realize one function, a problem may occur. For example, a function of automatically transmitting a fax document to an external server is realized by firmware for FAX and firmware for a scanner cooperating with each other. In this case, in a case where only the version of firmware on one side is upgraded and thus versions of the pieces of firmware are not equal to each other, a problem in which the function does not operate properly occurs.

The new version of each piece of firmware is created in order to extend the function and to correct the problem. Thus, in a case where version upgrade is not performed, and the version is maintained, performing a new function which has been added is not possible, and the problem is not corrected. In practice, the countermeasure-like correspondence in which version upgrade is not performed because of the fear of a problem, and version upgrade is performed after the problem occurs is easily provided.

Outline of Management Operation

In the exemplary embodiment, the management server 10 controls version upgrade such that a problem does not occur in a case where version upgrade of firmware held by the processing device is performed. Specifically, the management server 10 performs version upgrade such that a version configuration after version upgrade is equivalent to a version configuration which is being applied to any of the plural processing devices 12. The version configuration which is being applied to any of the plural processing devices 12 has a low possibility of an occurrence of a problem because the track record of an operation is provided in the above version configuration.

Figure 5:
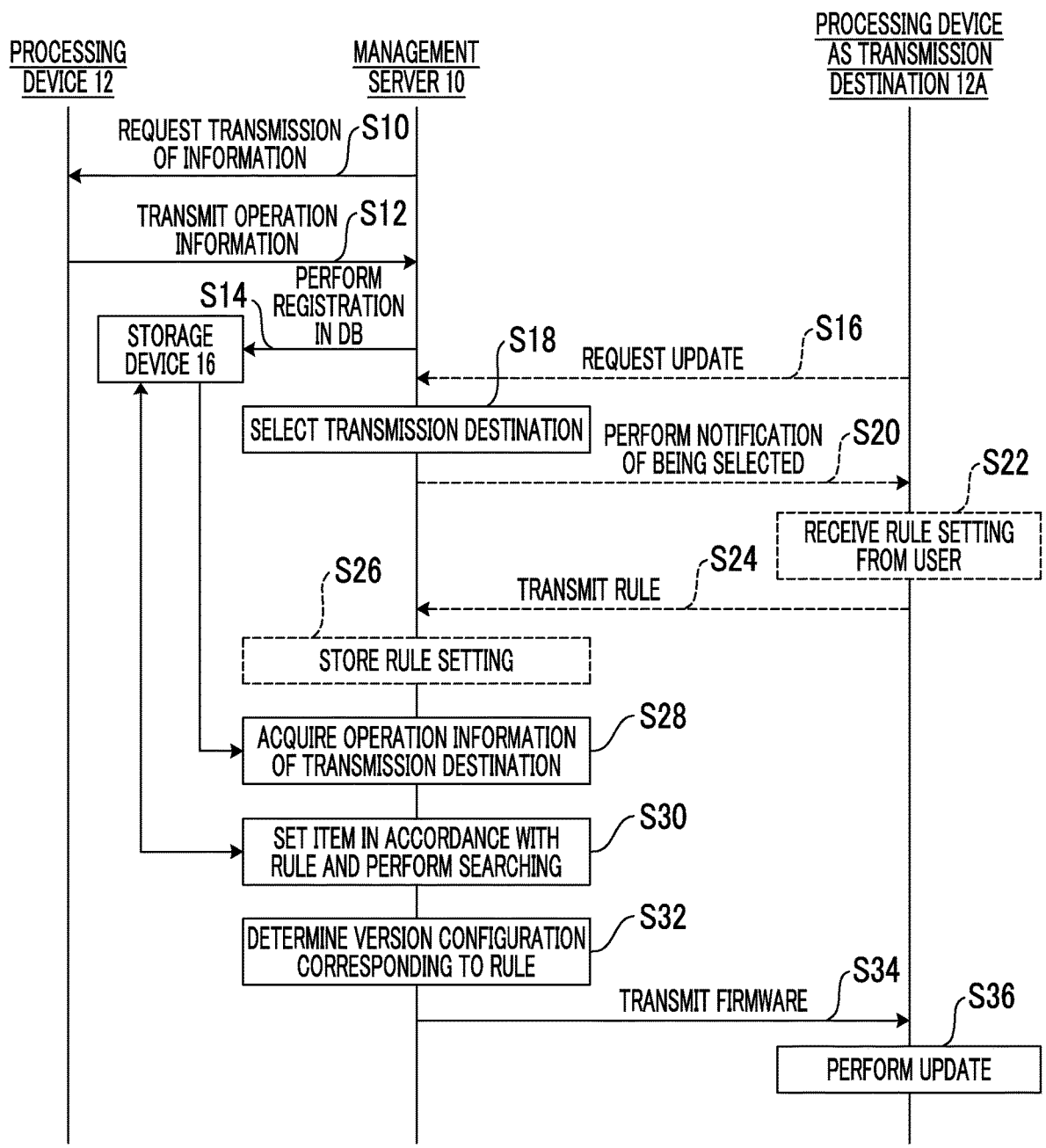
FIG. 5 is a sequence diagram illustrating an example of communication between devices in the management system.

FIG. 5 is a sequence diagram illustrating an example of communication of information between devices in the management system. As illustrated in FIG. 5, the management server 10 requests transmission of operation information from each of the plural processing devices 12 which are being managed (Step 10). Here, "the operation information" is information indicating a use situation of each of the processing devices and is information including a version configuration and a use history.

Each of the plural processing devices 12 transmits the operation information to the management server 10 in response to the request from the management server 10 (Step 12). The management server 10 stores the received operation information in the storage device 16, in association with identification information of each of the plural processing devices 12. Operation information of a specific processing device 12 is extracted by the identification information.

The management server 10 selects a target processing device 12A which is to perform version upgrade, from the plural processing devices 12 (Step 18). The processing device 12A is referred to as "a processing device 12A as a transmission destination" by the meaning of an address for transmitting firmware of a new version. The selection may be performed in response to a request (Step 16) for an update from the processing device 12A as the transmission destination. In a case where the processing device 12A as the transmission destination is selected in response to the request for the update, the selected processing device 12A is notified of a message indicating that the processing device has been selected (Step 20).

The processing device 12A as the transmission destination, which receives the notification may display a setting screen for setting a rule in the operation display portion and may receive the setting of the rule from a user (Step 22). The rule set by the user is transmitted to the management server 10 (Step 24). The management server 10 stores the rule set by the user, in the storage portion in advance (Step 26).

Then, the management server 10 acquires operation information of the processing device 12A as the transmission destination from the storage device 16 (Step 28). Then, the management server 10 sets a search item in accordance with the predetermined rule and searches for a desired version configuration (Step 30). A specific version configuration corresponding to the predetermined rule is selected from plural version configurations which have been acquired in advance, by the search.

For example, in a case where two rules of "applying the latest version configuration" and "being applied only to a version of a use function" are set, functions which are being used are narrowed down based on the operation information of the processing device 12A as the transmission destination and a version configuration in which the version of firmware for the function which is being used is caused to be upgraded to the latest version.

The management server 10 determines whether or not version upgrade of the firmware of the processing device 12A as the transmission destination is performed by using the selected version configuration (Step 32). For example, in a case where a version configuration applied to the processing device 12A as the transmission destination is compared to a specific version configuration and, as a result, the version configurations have a difference from each other, the management server 10 determines to use the specific version configuration.

Firmware of a new version among plural pieces of firmware relating to the specific version configuration is acquired from the storage device 16 and is transmitted to the processing device 12A as the transmission destination (Step 34). In a case where plural pieces of firmware are collectively updated, firmware relating to the specific version configuration is acquired from the storage device 16 and is transmitted to the processing device 12A as the transmission destination. The processing device 12A as the transmission destination is updated with the received firmware.

Program

Next, a control program executed by the CPU 20A of the management server 10 will be described. As processing (control program) executed by the CPU 20A, "information collection processing" of collecting operation information from the plural processing devices 12 and "update processing" of performing version upgrade of firmware held by the processing device 12A as the transmission destination. The program is stored in the ROM 20B of the management server 10. In a case where an instruction to start execution of the program is performed by the manager, the program is read and executed by the CPU 20A (see FIG. 2).

Information Collection Processing

Figure 6:
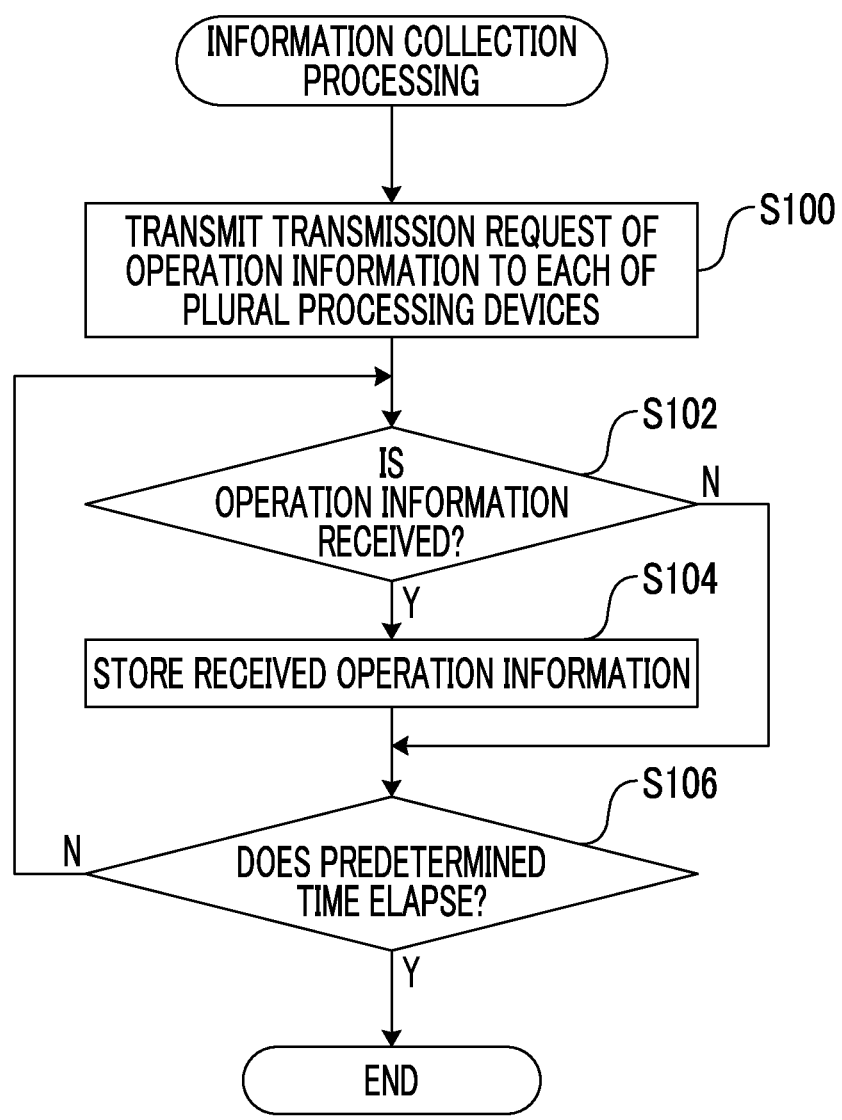
FIG. 6 is a flowchart illustrating an example of a flow of processing of a control program for "information collection processing"

Firstly, "the information collection processing" will be described. A function unit that performs an "information collection processing" function is an example of "an acquisition section". FIG. 6 is a flowchart illustrating an example of a flow of processing of the control program for "the information collection processing". Firstly, in Step 100, transmission of operation information is requested from each of the plural processing devices 12 which are being managed. Each of the plural processing devices 12 transmits operation information to the management server 10 in response to the request from the management server 10.

Then, in Step 102, it is determined whether or not the operation information is received. In a case where the operation information is received, the process proceeds to Step 104. In Step 104, the received operation information is stored in the storage device 16 in association with identification information of the processing device 12. In a case where the operation information is not received, the process skips Step 104 and proceeds to Step 106.

In Step 106, it is determined whether or not a predetermined time elapses. In a case where the predetermined time has elapsed, the routine ends. In a case where the predetermined time does not elapse, the process returns to Step 102, and receiving the operation information from the processing device 12 continues until the predetermined time elapses.

"The operation information" is information indicating a use situation of the processing device and includes a version configuration and a use history. Specifically, "the operation information" may include information as follows.

That is, information regarding a product name, the serial number, version information of firmware (scanning, printing, copying, fax, authentication, aggregation, and the like), a use history, a communication counterpart device, an authentication history, an authentication device (reader (model number, version), card (model number, version)), an operation history, an audit history, an error history, the number of pages to be output, the number of pages to be read, a communication data volume, meta information, a use function, and an operation time may be included.

Update Processing

Figure 7:
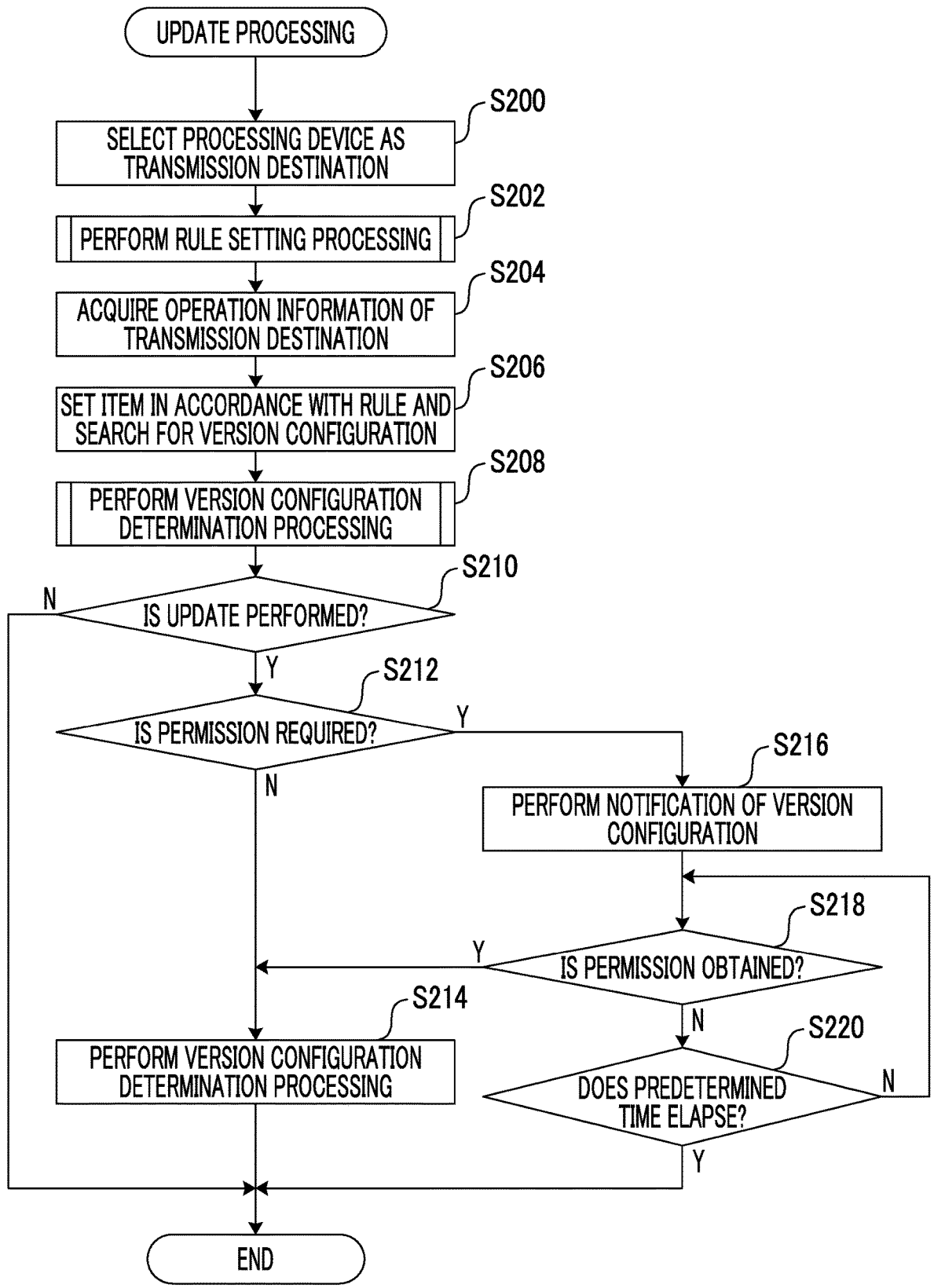
FIG. 7 is a flowchart illustrating an example of a flow of "update processing"

Next, "the update processing" will be described. FIG. 7 is a flowchart illustrating an example of a flow of processing for "the update processing". Firstly, in Step 200, a processing device as a transmission destination, which is to perform version upgrade is selected from the plural processing devices 12. In Step 202, "rule setting processing" of setting the rule is performed. In the first exemplary embodiment, the default rule is preset by the manager and is stored in the storage portion such as the memory 20D in advance. In the first exemplary embodiment, the preset default rule is applied.

In Step 204, operation information of the processing device as the transmission destination is acquired from the storage device. Then, in Step 206, a search item is set in accordance with a predetermined rule and a desired version configuration is searched. In Step 208, "version configuration determination processing" of determining a version configuration used for version upgrade in the processing device as the transmission destination is performed. A specific version configuration corresponding to the predetermined rule is selected from plural version configurations which have been acquired in advance, and it is determined that the specific version configuration is used for version upgrade in the processing device as the transmission destination.

In Step 210, it is determined whether or not version upgrade is performed, in accordance with the search result and the predetermined rule. In a case where version upgrade is performed, the process proceeds to Step 212. In a case where version upgrade is not performed, the routine ends. For example, in a case where a difference between the original version configuration which is being applied to the processing device 12A as the transmission destination and the specific version configuration is not provided, in a case where the specific version configuration has not been selected, version upgrade is not performed.

Then, in Step 212, it is determined whether or not a permission of a user for version upgrade is required. For example, in a case where the latest version includes the usage agreement attached thereto or a case where the rule is set to obtain a permission, the permission of the user is required. In a case where the permission is required, the process proceeds to Step 216. In a case where the permission is not required, the process proceeds to Step 214. In Step 214, firmware of a new version among plural pieces of firmware relating to the specific version configuration is acquired from the storage device and is transmitted to the processing device as the transmission destination.

In a case where the process has proceeded to Step 216 from Step 212 because the permission of the user is required, in Step 216, a notification of the selected specific version configuration is performed. In Step 218, it is determined whether or not the permission from the user is received. In a case where the permission is received, the process proceeds to Step 214, and firmware of a new version is transmitted to the processing device as the transmission destination. In a case where the permission has not been received, the process proceeds to Step 220.

Then, in Step 220, it is determined whether or not a predetermined time elapses. In a case where the predetermined time has elapsed, the routine ends. In a case where the predetermined time does not elapse, the process returns to Step 218, and the determination is repeated.

Version Configuration Determination Processing

Figure 11:
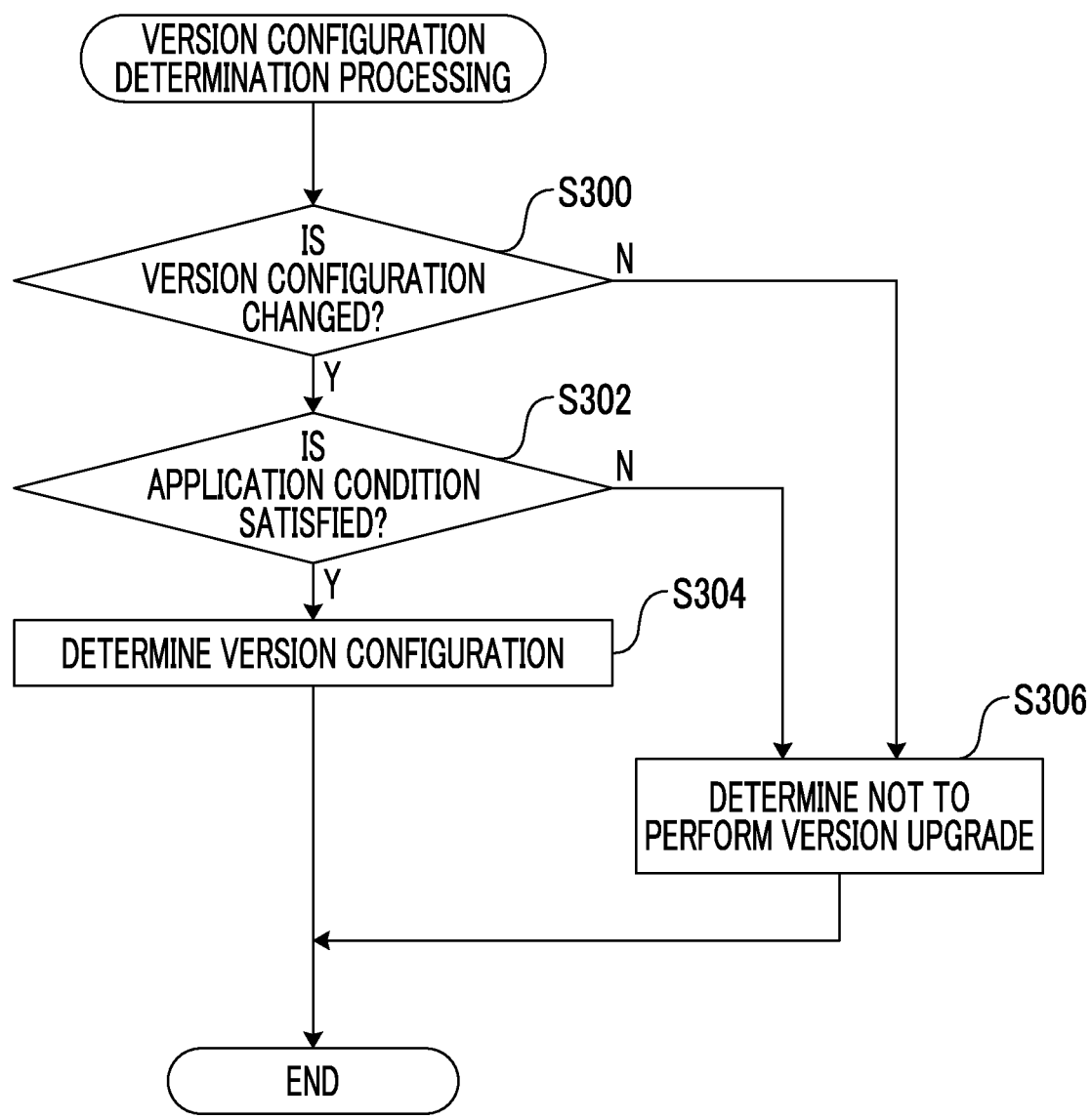
FIG. 11 is a flowchart illustrating an example of a flow of "version configuration determination processing"

Next, "version configuration determination processing" performed in Step 208 will be described. A function unit that performs a "version configuration determination processing" function is an example of "a selection section". FIG. 11 is a flowchart illustrating an example of a flow of the "version configuration determination processing". Firstly, in Step 300, according to the specific version configuration, it is determined whether or not the original version configuration which is being applied to the processing device 12A as the transmission destination is changed. In a case where the original version configuration is changed, the process proceeds to Step 302. In a case where the original version configuration is not changed, the process proceeds to Step 306.

In Step 302, it is determined whether or not the selected specific version configuration satisfies an application condition which has been defined in the rule. As will be described later, various rules relating to, for example, a function to which version upgrade is subjected (target of version upgrade), and a case where version upgrade is performed (condition of version upgrade) are predetermined. In a case where the predetermined rule is satisfied, the process proceeds to Step 304. In a case where the predetermined rule is not satisfied, the process proceeds to Step 306.

In Step 304, it is determined that the specific version configuration is used for performing version upgrade of firmware in the processing device as the transmission destination. In Step 306, it is determined that version upgrade is not performed, and the routine ends. That is, in a case where the version configuration is not changed and a case where the predetermined rule is not satisfied, version upgrade is not performed.

Procedure of Determining Version Configuration

Here, a procedure of determining the version configuration will be specifically described. The specific version configuration corresponding to the predetermined rule is selected from plural version configurations which have been acquired in advance, and it is determined that version upgrade is performed by using the selected specific version configuration.

FIG. 8 is a diagram illustrating an example of operation information of the processing device as the transmission destination. In the example, the processing device as the transmission destination includes the scanner function, the FAX function, and the copying function. The version of firmware of the scanner function is 1.2. The version of firmware of the FAX function is 2.1. The version of firmware of the copying function is 3.5. It is understood that the copying function and the FAX function are used, from a use history. In the following descriptions, for simple descriptions, an A function is described as having a version B.

Latest Version Configuration

FIG. 9 is a diagram illustrating an example of the version configuration selected in accordance with the rule. In the example, two rules of "applying the latest version (Rule 1)" and "being applied only to a version of the use function (Rule 2)" are provided as the predetermined default rule. That is, the rule means that the version of the use function is set to be the latest. The use function is the copying function and the FAX function. In the default rule, the latest version has priority and other functions (scanner function and printing function) are also set to have the latest version.

The copying function has the latest version 4.1. The facsimile function has the latest version 2.4. The scanner function has the latest version 1.7. The printing function has the latest version 3.4. Any of the versions of the scanner function, the FAX function, and the copying function held by the processing device as the transmission destination does not have the latest version, and thus version upgrade is required.

In accordance with the default rule, a specific version configuration in which the copying function has the latest version 4.1, the facsimile function has the latest version 2.4, the scanner function has the latest version 1.7, and the printing function has the latest version 3.4 is searched for. As the search result, the specific version configuration illustrated in FIG. 9 is selected. The number of devices to which "the specific version configuration" in which each of the plural functions has the latest version is applied is 10. As the search result, the specific version configuration may not be selected.

Version Configuration Applied to Devices of which Number is Largest

FIG. 10 is a diagram illustrating another example of the version configuration selected in accordance with the rule. In the example, two rules of "applying the latest version configuration only to the version of the use function (Rule 1)" and "applying a version configuration applied to devices of which the number is largest (Rule 2)" are provided as the predetermined default rule.

That is, Rule 1 means that the version of the use function is set to be the latest. In Rule 2, the number of devices to which the version configuration is applied has priority. In Rule 2, a specific version configuration applied to devices of which the number is largest, that is, of which the number is greater than devices to which other version configurations are applied is searched from version configurations in which the use function has the latest version. It is not necessary that other functions have the latest version.

As the search result, the specific version configuration illustrated in FIG. 10 is selected. In the example illustrated in FIG. 10, the copying function has the latest version 2.4. The facsimile function has the latest version 2.4. The scanner function has the latest version 1.7. The printing function has the previous version, that is, the version 2.5. The number of devices to which "the specific version configuration" is applied is 10,000.

Second Exemplary Embodiment

A second exemplary embodiment has the same configuration as that of the first exemplary embodiment except that the rule setting is received from the user. Thus, descriptions of the same components will not be repeated and only a difference will be described. In the first exemplary embodiment, in "the rule setting processing" of the update processing illustrated in FIG. 7, an example in which the default rule is preset by the manager and is stored in the storage portion such as the memory 20D in advance is described. However, in the second exemplary embodiment, "rule setting processing" illustrated in FIG. 12 is performed.

Rule Setting Processing

Figure 12:
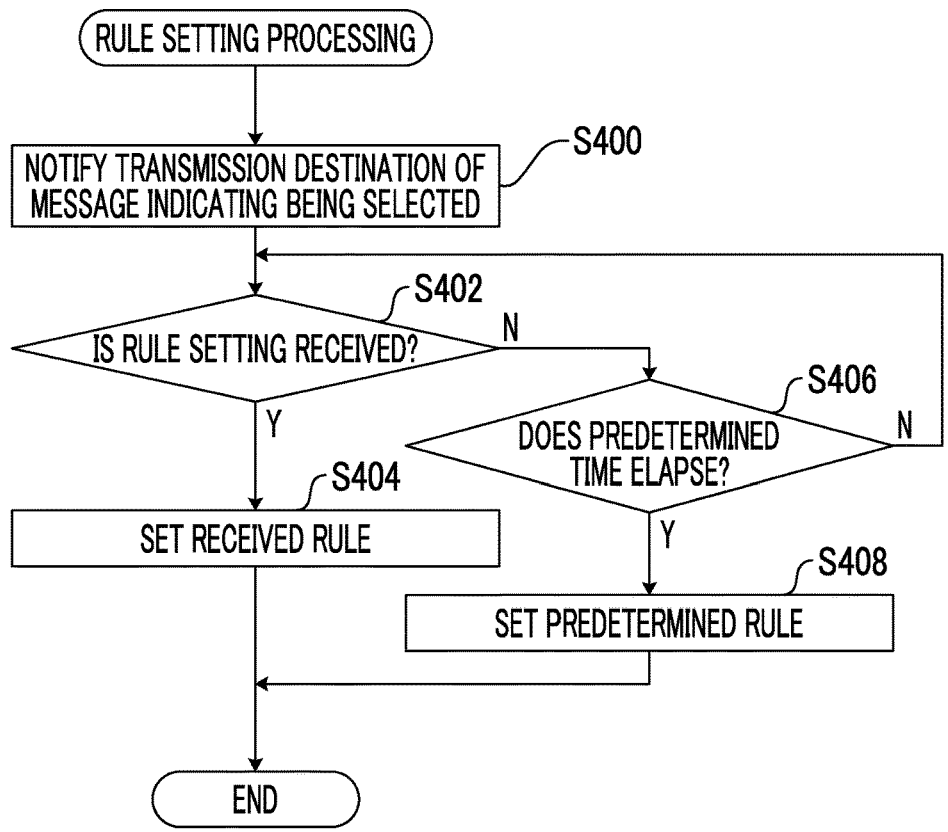
FIG. 12 is a flowchart illustrating an example of a flow of "rule setting processing" according to a second exemplary embodiment.

FIG. 12 is a flowchart illustrating an example of a flow of "the rule setting processing" according to the second exemplary embodiment. Firstly, in Step 400, the processing device as the transmission destination is notified of a message indicating that the processing device has been selected as the transmission destination. As will be described next, a rule set by a user is transmitted from the processing device as the transmission destination to the management server. In Step 402, it is determined whether or not the rule setting is received. In a case where the rule setting is received, the process proceeds to Step 404. In Step 404, the received rule is set. That is, the rule set from the user has been stored in the storage portion such as the memory 20D, in advance.

In a case where the rule setting is not received, the process proceeds to Step 406. In Step 406, it is determined whether or not a predetermined time elapses. In a case where the predetermined time does not elapse, the process returns to Step 402, and it is determined again whether or not the rule setting is received.

In a case where the predetermined time has elapsed, the process proceeds to Step 408. In Step 408, since the rule setting from the user is not performed, similar to the first exemplary embodiment, "the default rule" which has been set by the manager in advance is set and the routine ends.

Rule-Setting Receiving Processing

Figure 13:
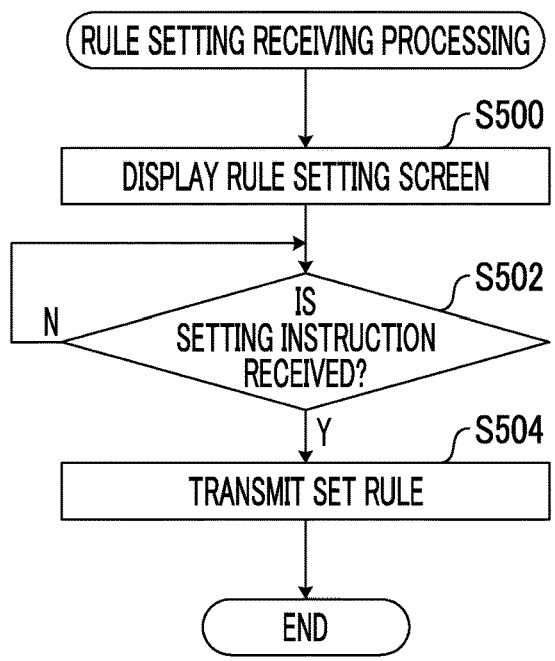
FIG. 13 is a flowchart illustrating an example of a flow of "rule-setting receiving processing" performed in a target processing device.

"Rule-setting receiving processing" is performed in the processing device, in correspondence with "the rule setting processing". FIG. 13 is a flowchart illustrating an example of a flow of "the rule-setting receiving processing" performed in the target processing device. The CPU 30A of the processing device 12 reads and executes a control program of "the rule-setting receiving processing" from the storage device such as the ROM 30B (see FIG. 3). "The rule-setting receiving processing" start in a case where the notification of the message indicating that "the processing device has been selected as the transmission destination" is received from the management server.

Firstly, in Step 500, the processing device as the transmission destination, which has received the notification displays a rule setting screen for setting a rule, in the operation display portion 32. Then, it is determined whether or not an instruction to set the rule is performed. In a case where the instruction to set the rule is not performed, the determination is repeated in Step 502. In a case where the instruction to set the rule is performed, the process proceeds to Step 504. In Step 504, the set rule is transmitted to the management server and the routine ends.

Figure 14:
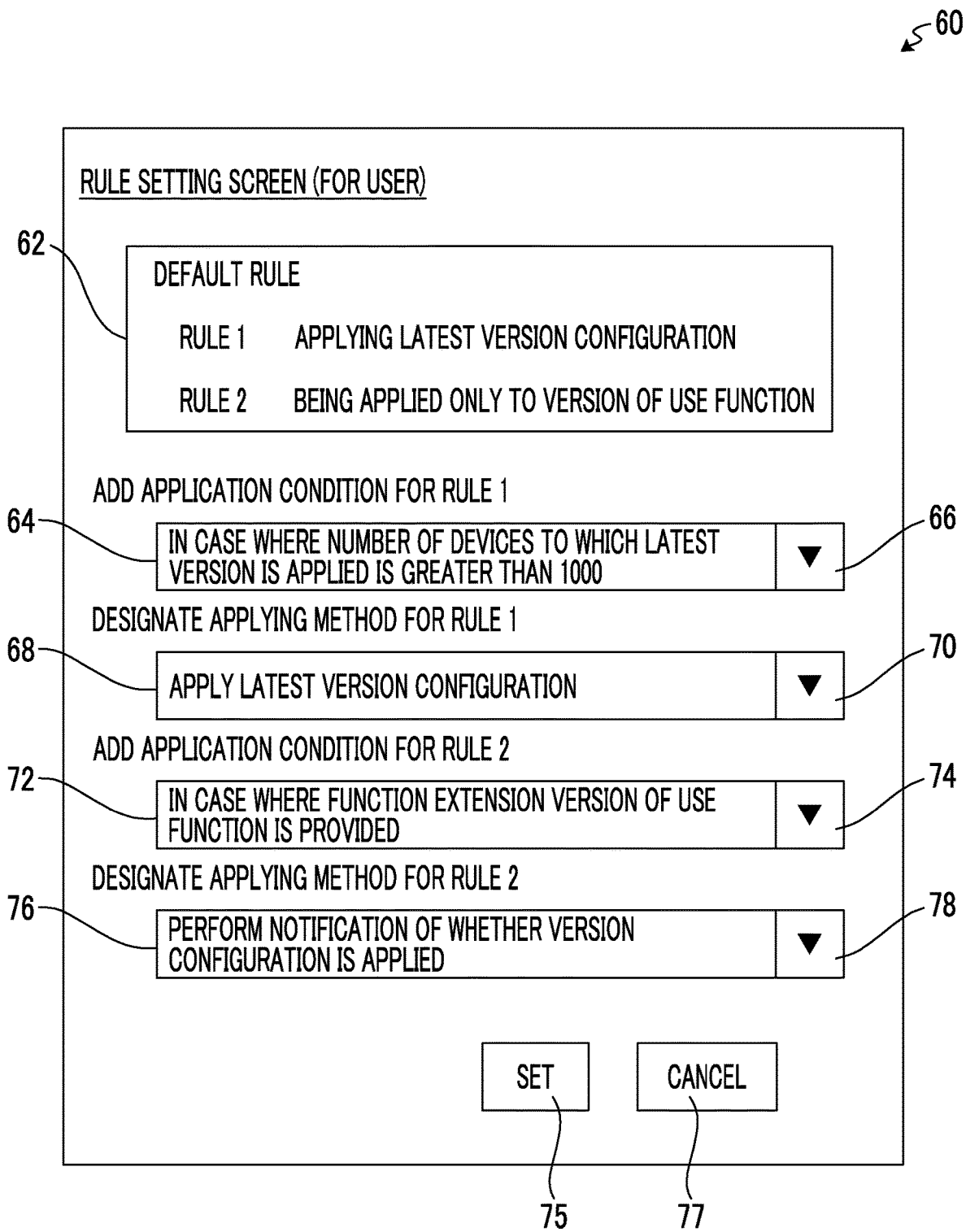
FIG. 14 is a plan view illustrating an example of "a rule setting screen" displayed to a user.

FIG. 14 is a plan view illustrating an example of "the rule setting screen" displayed to a user. As illustrated in FIG. 14, a display field 62, selection fields 64, 68, 72, and 76, and buttons 66, 70, 74, 78, 75, and 77 are provided in the rule setting screen. The default rule is displayed in the display field 62. The rule setting from the user is performed in a manner of changing the default rule.

Options for selecting a condition added to the default rule or options for designating an applying method are displayed in the selection fields 64, 68, 72, and 76 by pressing the corresponding buttons 66, 70, 74, and 78, respectively. The button 75 is a button for an instruction of setting. The button 77 is a button for canceling setting performed on the rule setting screen.

In the example illustrated in FIG. 14, the selection field 64 is a field for selecting an application condition to be added to Rule 1, and an option of "in a case where the number of devices to which the latest version is applied is greater than 1000" is selected. The selection field 68 is a field for selecting an applying method designated in Rule 1, and an option of "applying the latest version configuration" is selected.

The selection field 72 is a field for selecting an application condition to be added to Rule 2, and an option of "in a case where a function extension version of the use function is provided" is selected. The selection field 76 is a field for selecting an applying method designated in Rule 2, and an option of "performing notification of whether the version configuration is applied" is selected. "The function extension" means that a new function is added.

The user selects a desired option for, for example, an application condition to be added, or a designated applying method, and presses the button for an instruction of setting. In a case where the setting is changed by the user, the changed rule is transmitted to the management server and is stored in the storage portion of the management server in advance.

Third Exemplary Embodiment

Figure 15:
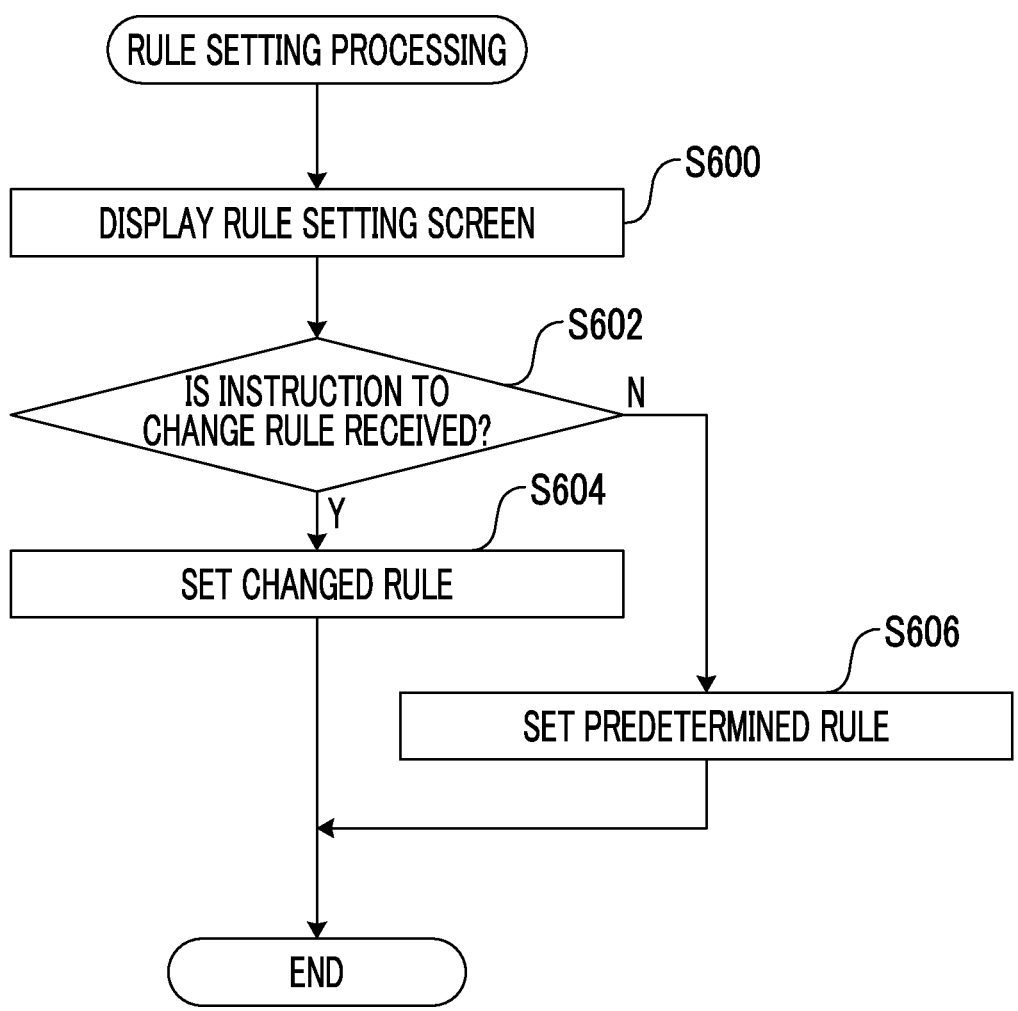
FIG. 15 is a flowchart illustrating an example of a flow of "rule setting processing" according to a third exemplary embodiment.

A third exemplary embodiment has the same configuration as that of the first exemplary embodiment except that the rule setting is received from the manager. Thus, descriptions of the same components will not be repeated and only a difference will be described. FIG. 15 is a flowchart illustrating an example of a flow of "the rule setting processing" according to the third exemplary embodiment. In "the rule setting processing" of the update processing illustrated in FIG. 7, the example in which the default rule is preset by the manager and is stored in the storage portion such as the memory 20D in advance is described. However, in the third exemplary embodiment, "rule setting processing" in which the manager changes the default rule is performed.

Rule Setting Processing

Firstly, in Step 600, the rule setting screen for setting a rule is displayed in the display portion 22. Then, in Step 602, it is determined whether or not an instruction to change the setting of the default rule is performed. In a case where the instruction to change the rule is performed, the process proceeds to Step 604. In Step 604, the changed rule is set and the routine ends.

In a case where the instruction to change the rule is not performed, the process proceeds to Step 606. In Step 606, since the rule change by the manager is not performed, similar to the first exemplary embodiment, "the default rule" which has been set by the manager in advance is set and the routine ends.

Figure 16:
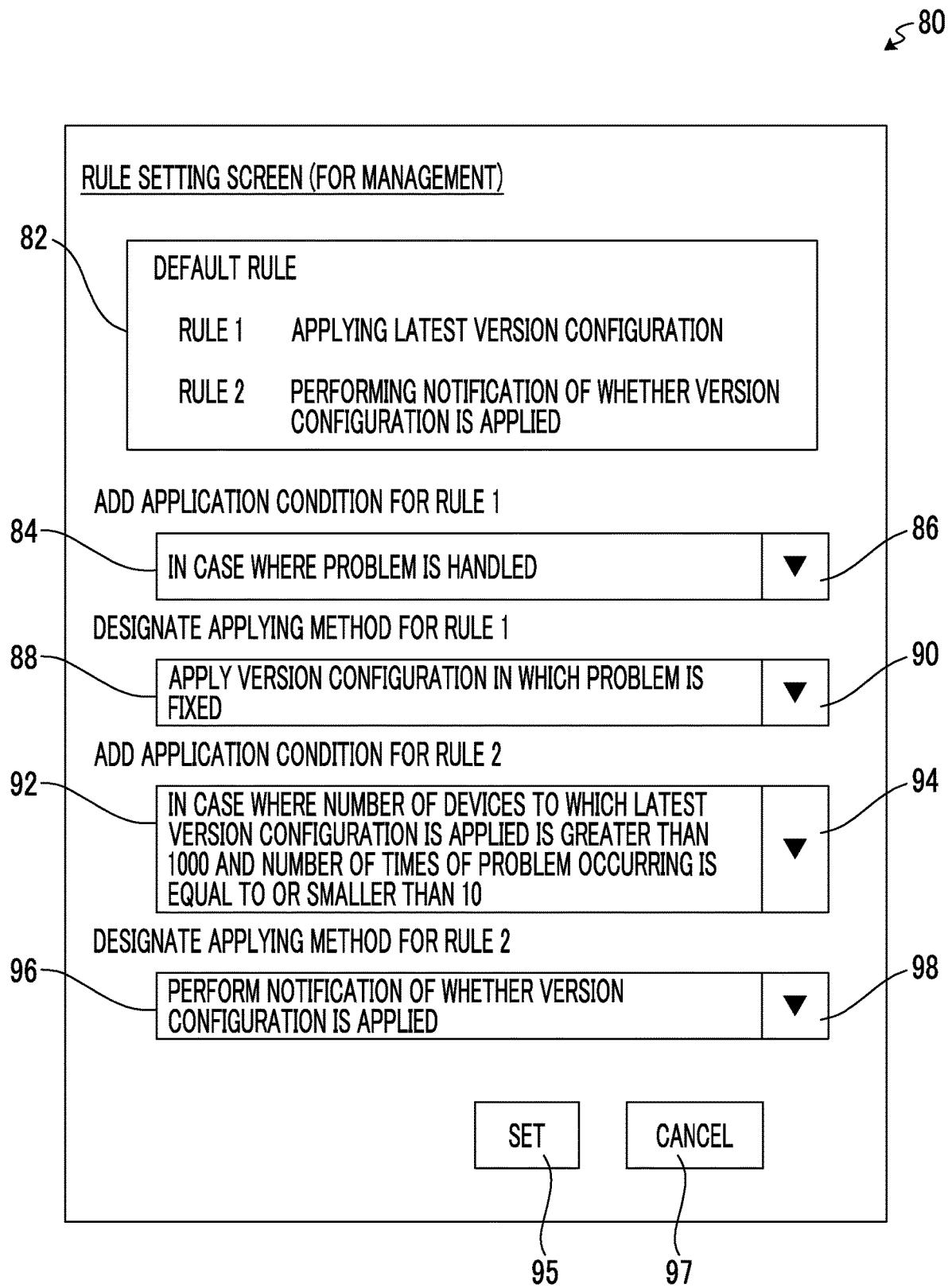
FIG. 16 is a plan view illustrating an example of "the rule setting screen" displayed to a manager.

FIG. 16 is a plan view illustrating an example of "the rule setting screen" displayed to the manager. As illustrated in FIG. 16, a display field 82, selection fields 84, 88, 92, and 96, and buttons 86, 90, 94, 98, 95, and 97 are provided in the rule setting screen. The default rule is displayed in the display field 82. The rule setting from the manager is performed in a manner of changing the default rule.

Options for selecting an application condition added to the default rule or options for designating an applying method are displayed in the selection fields 84, 88, 92, and 96 by pressing the corresponding buttons 86, 90, 94, and 98, respectively. The button 95 is a button for an instruction of setting. The button 97 is a button for canceling setting performed on the rule setting screen.

In the example illustrated in FIG. 16, the selection field 84 is a field for selecting an application condition to be added to Rule 1, and an option of "in a case where a problem is handled" is selected. The selection field 88 is a field for selecting an applying method designated in Rule 1, and an option of "applying a version configuration in which the problem is fixed" is selected.

The selection field 92 is a field for selecting an application condition to be added to Rule 2, and an option of "in a case where the number of devices to which the latest version configuration is greater than 1000 and the number of times of the problem occurring is equal to or smaller than 10" is selected. The selection field 96 is a field for selecting an applying method designated in Rule 2, and an option of "performing notification of whether the version configuration is applied" is selected.

The manager selects a desired option for, for example, an application condition to be added, or a designated applying method, and presses the button for an instruction of setting. In a case where the setting is changed by the manager, the changed rule is transmitted to the management server and is stored in the storage portion of the management server in advance.

FIG. 17 is a diagram illustrating an example of the changed rule setting. In the example illustrated in FIG. 17, "applying the latest version configuration" in Rule 1 of the default rule illustrated in FIG. 16 is changed to a rule of "applying the latest version configuration in which the problem is fixed, in a case where a problem is handled". In addition, "being applied only to a version of the use function" in Rule 2 of the default rule is changed to a rule of "performing notification of whether the version configuration is applied".

In a case where the rule illustrated in FIG. 17 is set, in "the version configuration determination processing" illustrated in FIG. 11, in Step 302, it is confirmed whether or not a version having a problem is provided, in a case where it is determined whether or not the specific version configuration satisfies an application condition defined in the rule. The management server recognizes, for example, the number of times of a problem occurring, for each version of each piece of firmware. In a case where the specific version configuration includes a version having a problem, the specific version configuration does not satisfy the predetermined rule. Thus, the process proceeds to Step 306. In Step 306, it is determined that version upgrade is not performed. Then, the routine ends.

Fourth Exemplary Embodiment

A fourth exemplary embodiment has the same configuration as that of the first exemplary embodiment except that, in a case where a function difference is provided before and after version upgrade, it is determined that a specific version configuration with a condition of obtaining a permission of a user is applied to the processing device as the transmission destination. Thus, descriptions of the same components will not be repeated and only a difference will be described.

FIG. 18 is a diagram illustrating another example of the changed rule setting. In the example illustrated in FIG. 18, "being applied only to a version of the use function" in Rule 2 of the default rule illustrated in FIG. 16 is changed to a rule of "performing notification of whether the version configuration is applied, in a case where the function difference is provided".

Version Configuration Determination Processing

Figure 19:
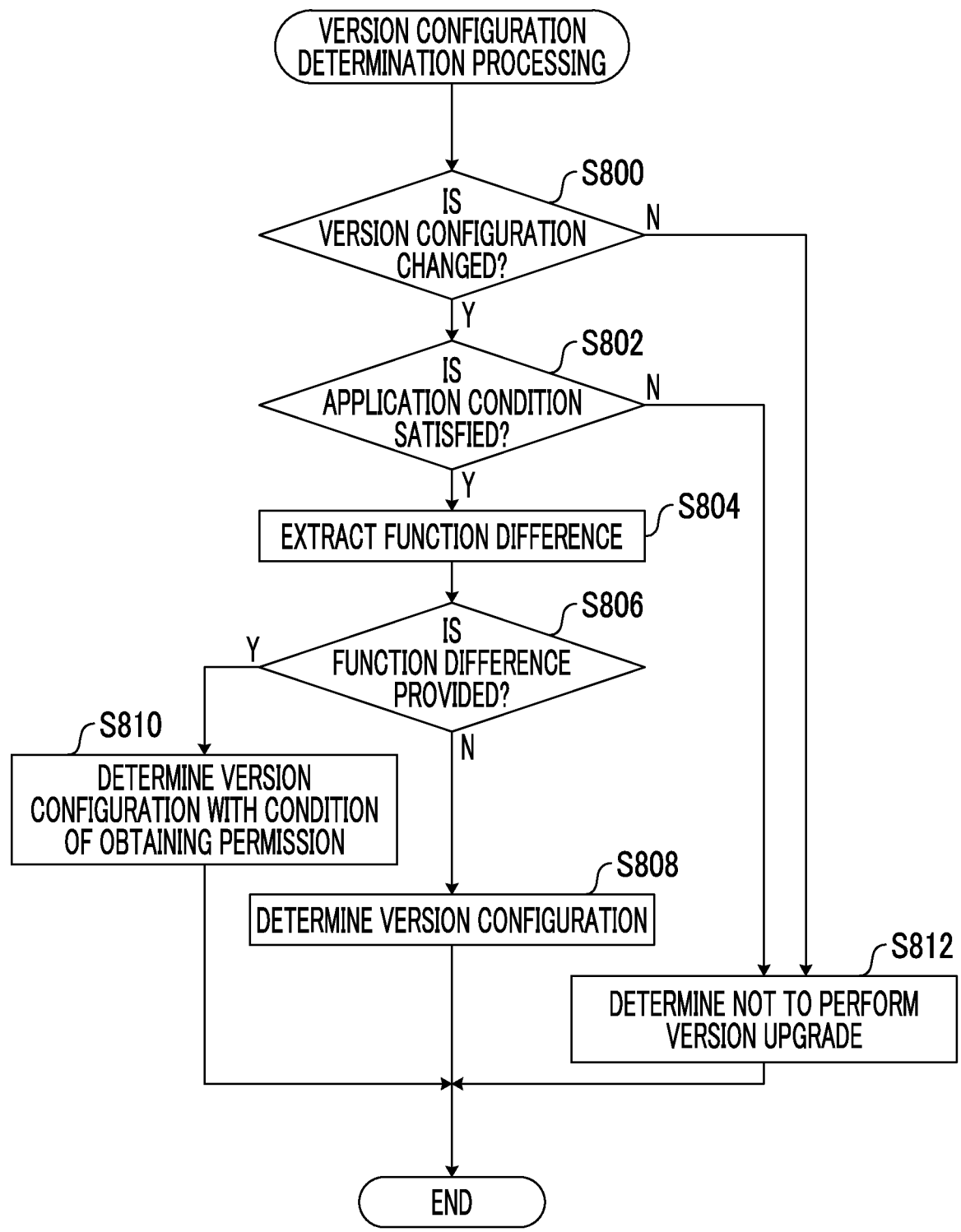
FIG. 19 is a flowchart illustrating an example of a flow of "version configuration determination processing" according to a fourth exemplary embodiment.

FIG. 19 is a flowchart illustrating an example of a flow of "the version configuration determination processing" according to the fourth exemplary embodiment. Firstly, in Step 800, it is determined whether or not the version configuration applied to the processing device as the transmission destination is changed, according to the specific version configuration. In a case where the version configuration is changed, the process proceeds to Step 802. In a case where the version configuration is not changed, the process proceeds to Step 812.

In Step 802, it is determined whether or not the selected specific version configuration satisfies the application condition defined in the rule. In a case where the selected specific version configuration satisfies the application condition, the process proceeds to Step 804. In a case where the selected specific version configuration does not satisfy the application condition, the process proceeds to Step 812.

Then, in Step 804, a function difference before and after version upgrade is extracted. The function difference means whether or not a new function to be added is provided or the function is changed. The function difference will be described later with a specific example. In Step 806, it is determined whether or not the function difference is provided. In a case where there is no function difference, the process proceeds to Step 808.

In Step 808, it is determined that the specific version configuration is used for performing version upgrade of firmware in the processing device as the transmission destination. In a case where the function difference is provided, the process proceeds to Step 810. In Step 810, it is determined to use the specific version configuration with a condition of obtaining a permission of the user.

In Step 212 in FIG. 7, it is determined whether or not a permission is required. In a case where the permission is required, in Step 216, the user is notified of the specific version configuration. In a case where it is determined to use the specific version configuration with the condition of obtaining a permission of the user, the user is notified of the extracted function difference along with the specific version configuration. In a case where the permission of the user is obtained, version upgrade is performed.

In Step 812, it is determined that version upgrade is not performed. Then, the routine ends. That is, in a case where the version configuration is not changed and a case where the predetermined rule is not satisfied, version upgrade is not performed.

Notification of Function Difference

Here, the function difference and a notification thereof will be described.

FIG. 20 is a diagram illustrating an example of operation information of the processing device as the transmission destination. In the example, the processing device as the transmission destination includes a card control function. The card control function has a version 2.1. The type of a card used in card control is ID card 1.1. It is understood that the card control function is used in authentication processing, from a use history.

Figure 21:
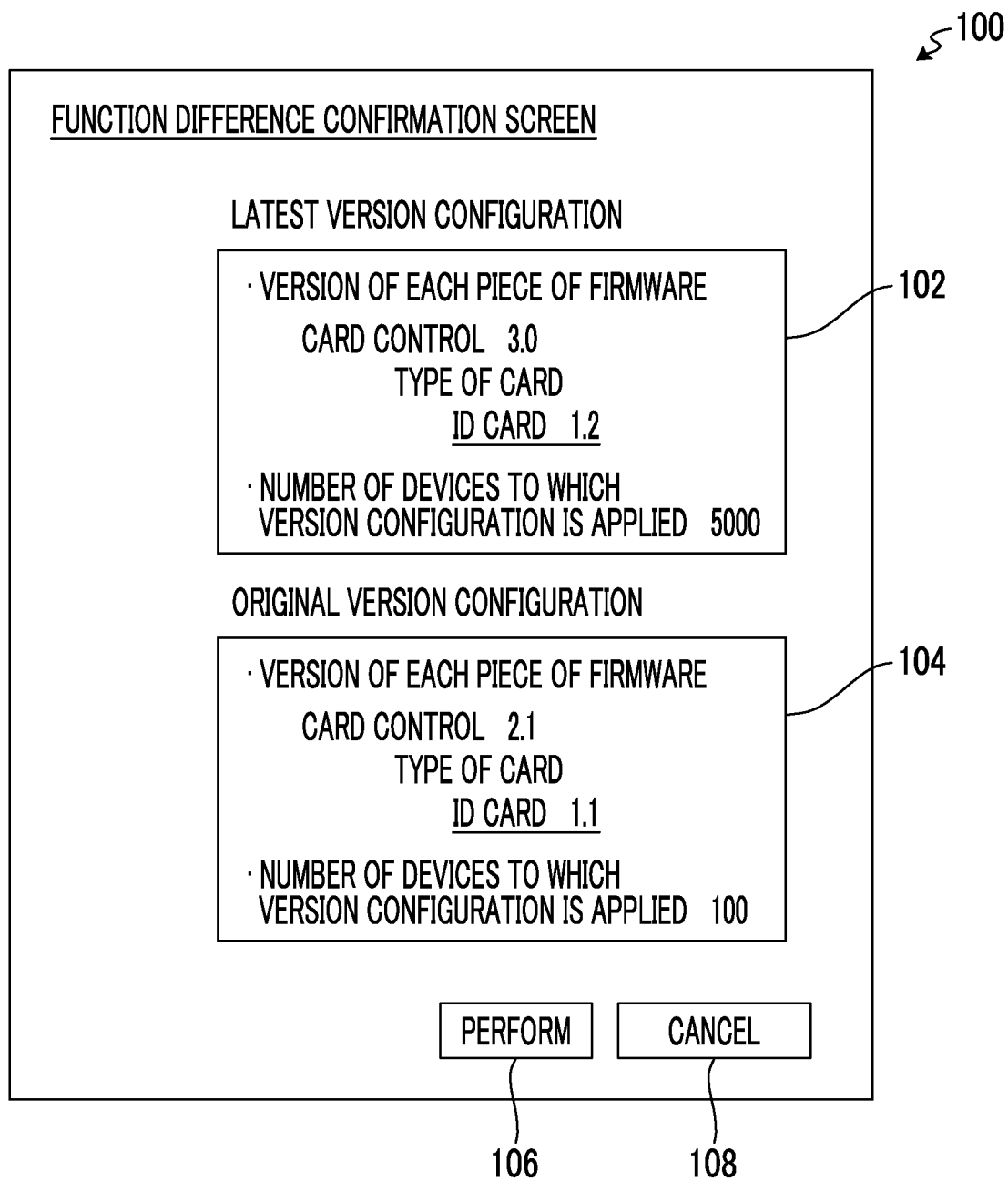
FIG. 21 is a plan view illustrating an example of "a function difference confirmation screen" displayed to the user.

FIG. 21 is a plan view illustrating an example of "a function difference confirmation screen" displayed to the user. As illustrated in FIG. 21, a version configuration 102 after update and a version configuration 104 before the update are displayed in the function difference confirmation screen so as to be arranged such that the version configuration after update and the version configuration before the update can be compared to each other. Thus, it is possible to recognize a function difference between both the version configurations. A button 106 for an instruction to perform version upgrade and a button 108 for an instruction of not performing version upgrade are provided. "Performing" is displayed on the button 106 and "cancel" is displayed on the button 108.

The version configuration 102 after the update indicates the latest version configuration. The card control function has the latest version 3.0. In the latest version 3.0, the type of a card used in card control is ID card 1.2.

The version configuration 104 before the update indicates the original version configuration. The original version configuration is obtained from the operation information illustrated in FIG. 20. The card control function has a version 2.1 and this is not the latest version.

The number of devices to which the latest version 3.0 is applied is 5000, and the number of devices to which the version 2.1 is applied is 100. The number of devices to which the latest version 3.0 is applied is much more than the number of devices to which the version 2.1 is applied. However, in a case of applying the latest version 3.0, it takes time and effort to change ID card 1.1 used in the authentication processing to "ID card 1.2".

The user confirms that the function difference is provided before and after version upgrade, and then can determine whether or not version upgrade is performed.

Modification Examples

The configurations of the information processing apparatus, the program, and the management system described in the exemplary embodiments are just an example and may be changed in a range without departing from the gist of the present invention.

The rule set in the exemplary embodiments is just an example, and various rules may be set. For example, a rule may be set based on the use history, to select a specific version configuration applied to a processing device having the longest operation time, that is, a processing device having an operation time longer than those of other processing devices. Alternatively, a rule may be set based on the use history, to select a specific version configuration applied to a processing device in which the number of times of performing processing is the largest, that is, a processing device in which the number of times of performing processing is larger than those of other processing devices.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
acquire information regarding a version configuration indicating a combination of versions of a plurality of programs of a plurality of processing devices, from each of the plurality of processing devices; and
select a specific version configuration from a plurality of version configurations in accordance with a predetermined rule, in a case where version upgrade for a program held by a target processing device is performed,
wherein
the processor is further configured to acquire a use history of each of the plurality of processing devices,
wherein the predetermined rule includes a rule using the use history and is predetermined to select the specific version configuration applied to a processing device having an operation time longer than those of other processing devices, from the use history, and wherein
the processor is further configured to output at least one of a determination of whether or not the version upgrade is performed, or a program used for the version upgrade, based on a selection result obtained by the processor and the predetermined rule.

2. The information processing apparatus according to claim 1,
wherein the predetermined rule is predetermined to select the specific version configuration which causes one program or each of a plurality of programs held by the target processing device to have a latest version.

3. The information processing apparatus according to claim 2,
wherein the predetermined rule is predetermined to select the specific version configuration, in a case where a number of processing devices to which the specific version configuration is to be applied is greater than a predetermined positive number.

4. The information processing apparatus according to claim 2,
wherein the predetermined rule is predetermined so as not to perform the version upgrade in a case where a problem in the latest version is reported.

5. The information processing apparatus according to claim 4,
wherein the predetermined rule is predetermined so as to perform the version upgrade in a case where the problem in the latest version is fixed.

6. The information processing apparatus according to claim 1,
wherein the predetermined rule is predetermined to select the specific version configuration applied to processing devices of which a number is greater than a number of processing devices to which another version configuration is applied.

7. The information processing apparatus according to claim 1,
wherein the predetermined rule is predetermined so as to perform the version upgrade for a program used in the target processing device among a plurality of programs held by the target processing device.

8. The information processing apparatus according to claim 7,
wherein the predetermined rule is predetermined so as to perform the version upgrade in a case where a function of the program used in the target processing device is extended.

9. The information processing apparatus according to claim 1,
wherein the predetermined rule is predetermined to select the specific version configuration applied to a processing device in which a number of times of performing processing is larger than those of other processing devices, from the use history.

10. The information processing apparatus according to claim 1,
wherein the processor outputs a program used for the version upgrade to the target processing device in a case where the version upgrade is performed and a version configuration of the target processing device has a difference from the specific version configuration.

11. The information processing apparatus according to claim 1,
wherein, in a case where the version upgrade is not performed, the processor outputs a message indicating that the version upgrade is not performed to a manager or a user of the target processing device.

12. The information processing apparatus according to claim 11,
wherein the version upgrade is not performed in a case where a version configuration of the target processing device has no difference from the specific version configuration.

13. The information processing apparatus according to claim 1,
wherein the version upgrade is not performed in a case where the specific version configuration is not selected by the processor.

14. The information processing apparatus according to claim 1,
wherein the version upgrade is not performed in a case where the version upgrade is regulated by the predetermined rule.

15. The information processing apparatus according to claim 1, wherein in a case where a permission of a user is required for the version upgrade, the predetermined rule is predetermined so as not to perform the version upgrade, and the processor outputs a message indicating that the permission is required to a manager or a user of the target processing device.

16. The information processing apparatus according to claim 15, wherein the case where the permission of the user is required corresponds to any of a case where the latest version has a function difference from a version of a program held by the target processing device or a case where a usage agreement is attached to the latest version.

17. The information processing apparatus according to claim 15, wherein, in a case where the permission is obtained, the processor outputs the program used for the version upgrade to the target processing device.

18. The information processing apparatus according to claim 1, wherein the predetermined rule is set by a manager or a user of the target processing device.

19. The information processing apparatus according to claim 1, wherein the predetermined rule is set before version upgrade of the target processing device.

20. A non-transitory computer readable medium storing a program causing a computer to function as:

the processor of the information processing apparatus according to claim 1.

21. A management system comprising:

the information processing apparatus according to claim 1; and a plurality of processing devices in which version upgrade of a plurality of programs held by each of the processing devices is managed by the information processing apparatus.

* * * * *